UNITED STATES PATENT OFFICE.

HERMANN THOMS, OF BERLIN, GERMANY.

PROCESS OF MAKING PARA-PHENETOL CARBAMIDE.

SPECIFICATION forming part of Letters Patent No. 502,504, dated August 1, 1893.

Application filed November 18, 1892. Serial No. 452,446. (Specimens.)

*To all whom it may concern:*

Be it known that I, HERMANN THOMS, chemist, a subject of the Emperor of Germany, residing in the city of Berlin, German Empire, have invented certain new and useful Improvements in the Production of Para Phenetol Carbamide; and I do hereby declare that the following is a full, clear, and exact description of the invention, such as will enable others skilled in the art to which it appertains to make and use the same.

My previous researches (published in the *Pharm. Centralhalle*, March 24, 1892,) have shown that di-para-phenetylurea

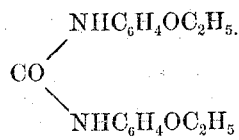

may be readily obtained, in addition to the hydrochlorid of phenetidin, by causing carbonylchlorid to act on a solution of para phenetidin in toluene. Since then I have found that this body, when heated for several hours with common urea

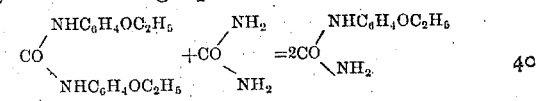

in equimolecular proportions in a closed vessel, and at a temperature ranging between 150° and 160° centigrade, is easily converted into the para phenetol carbamide as indicated by the following equation:—

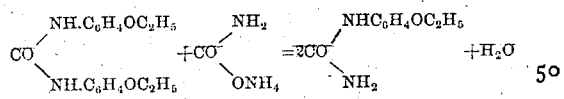

Instead of the common urea the carbamide salt of ammonia or commercial ammonium carbonate may be employed. The reaction takes place in the first case as indicated by the following equation:

$$CO\begin{matrix}NH.C_6H_4OC_2H_5\\ \\NH.C_6H_4OC_2H_5\end{matrix} + CO\begin{matrix}NH_2\\ \\ONH_4\end{matrix} = 2CO\begin{matrix}NHC_6H_4OC_2H_5\\ \\NH_2\end{matrix} + H_2O$$

I have found also, that instead of the di-paraphenetylurea paraphenetidin or the hydrochlorid of para-phenetidin may be employed, the latter being either treated in a closed vessel with common urea, or the carbamide salt of ammonia, or with commercial ammonium carbonate at a temperature of 160° centigrade; or an aqueous solution of the hydrochlorid of the paraphenetidin (three molecules) and common urea (two molecules) being heated and kept at the boiling point for a considerable time, the reaction being indicated by the following equation:

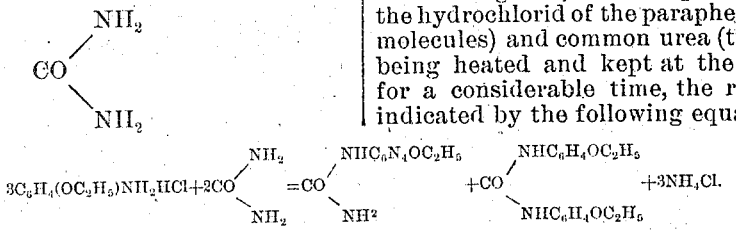

This process will yield, in addition to the para-phenetol carbamide, diparaphenetylurea. The paraphenetolcarbamide crystallizes from the hot filtrate.

The paraphenetolcarbamide obtained as described from diparaphenylurea, or from paraphenetidin by the action of common urea or the carbamide salt of ammonia, or commercial ammonium carbonate, melts at a temperature approaching 170° centigrade, and has a sweet taste of extraordinary intensity which renders it suitable for industrial application as a sweetening substance. According to physiological experiments, the new substance is quite harmless to the human organism.

Having thus described my invention, what I claim as new therein, and desire to secure by Letters Patent, is—

1. The process of obtaining paraphenetol carbamide, by the reaction of a para salt of phenetidin on a substance such as common urea in about the proportions set forth.

2. The process of obtaining para-phenetolcarbamide, which consists in boiling an aqueous solution of para-phenetidin-hydrochlorid with common urea in about the proportions set forth.

HERMANN THOMS.

Witnesses:
 FRITZ RINDEL,
 AUG. FRAHNE.